United States Patent
Macerini et al.

(10) Patent No.: US 9,941,836 B2
(45) Date of Patent: Apr. 10, 2018

(54) TRANSIENT CURRENT PROTECTION DEVICE FOR ELECTRICAL ENERGY CONVERSION SYSTEMS CONNECTED TO THE POWER GRID

(71) Applicant: ABB Technology AG, Zurich (CH)

(72) Inventors: Sauro Macerini, Levane-Bucine (IT); Giovanni Manchia, Terranuova Bracciolini (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/092,408

(22) Filed: Apr. 6, 2016

(65) Prior Publication Data
US 2016/0226398 A1    Aug. 4, 2016

Related U.S. Application Data

(63) Continuation of application No. PCT/IB2014/065142, filed on Oct. 8, 2014.

(30) Foreign Application Priority Data

Oct. 10, 2013 (IT) .................................. FI13A0236

(51) Int. Cl.
| | |
|---|---|
| *H02S 40/32* | (2014.01) |
| *H02M 1/32* | (2007.01) |
| *H02M 7/06* | (2006.01) |
| *H02M 7/5387* | (2007.01) |
| *H02M 1/12* | (2006.01) |
| *F03D 9/25* | (2016.01) |

(52) U.S. Cl.
CPC ............ *H02S 40/32* (2014.12); *H02M 1/32* (2013.01); *H02M 7/062* (2013.01); *H02M 7/53871* (2013.01); *F03D 9/255* (2017.02); *H02M 1/126* (2013.01); *Y02E 10/76* (2013.01)

(58) Field of Classification Search
CPC ... H02M 1/12; H02M 1/126; H02M 2001/123
USPC .......................................................... 363/40
See application file for complete search history.

(56) References Cited

U.S. PATENT DOCUMENTS 5,574,636 A  *  11/1996  Lee ..................... H02M 5/4585
                                                                363/132
2011/0044080 A1    2/2011  Ristimäki et al.
(Continued)

FOREIGN PATENT DOCUMENTS

| DE | 4135680 A1 | 5/1993 |
| DE | 10360549 A1 | 7/2005 |

(Continued)

OTHER PUBLICATIONS

European Patent Office, International Search Report & Written Opinion issued in corresponding Application No. PCT/IB2014/065142, dated Feb. 6, 2015, 11 pp.

(Continued)

*Primary Examiner* — Jeffrey Sterrett
(74) *Attorney, Agent, or Firm* — Taft Stettinius & Hollister LLP

(57) ABSTRACT

The present invention relates to a transient current and voltage protection device for electrical energy conversion systems connected to the power grid, comprising a diode bridge connected between the power grid and the power section of said inverter, upstream of the main filtering inductors.

26 Claims, 10 Drawing Sheets

(56) References Cited

U.S. PATENT DOCUMENTS

2013/0114321 A1    5/2013  Zhang
2016/0226398 A1*   8/2016  Macerini ................. H02M 1/32

FOREIGN PATENT DOCUMENTS

WO    0139347 A1   5/2001
WO    0223705 A1   3/2002

OTHER PUBLICATIONS

Tallam et al., "Integrated Differential-Mode and Common-Mode Filter to Mitigate the Effects of Long Motor Leads on AC Drivers," IEEE Transactions on Industry Applications, vol. 47, No. 5, Sep./Oct. 2011, pp. 2075-2083.

Frisch, et al., "High Efficient Topologies for Next Generation Solar Inverter," Internet Citation, Jul. 31, 2008, pp. 1-6.

* cited by examiner

TRANSIENT CURRENT PROTECTION DEVICE FOR ELECTRICAL ENERGY CONVERSION SYSTEMS CONNECTED TO THE POWER GRID

FIELD OF THE APPLICATION

The present invention relates to electrical energy conversion systems, in particular, but not exclusively, the present invention relates to conversion systems of the electrical energy generated by photovoltaic panel systems and adapted to be connected directly to the power grid.

BACKGROUND

Electrical energy conversion systems adapted to produce electrical energy for direct introduction on the power grids starting from electrical energy generated, for example, from one or more renewable sources, such as photovoltaic and wind generation plants, are known.

The aforesaid electrical energy conversion systems usually comprise an inverter apparatus (commonly known as inverter) adapted to convert DC (Direct Current) input voltage into an AC (Alternating Current) output voltage having the amplitude and frequency features required by the power grid. These inverter apparatuses are adapted to be connected directly to the power grid so as to supply the electrical energy required by the various devices, such as, for example, the electrical household appliances present in a home, or to transfer the generated energy to the power grid.

Systems of this type are subject to problems related to possible transient phenomena, present on the power grid, which may momentarily alter the features of the power grid voltage.

Indeed, in a common inverter, connected to the power grid, which converts the energy generated by one or more photovoltaic, wind generation sources etc., the transient currents, for example, resulting from an overvoltage on the power grid, freely transit through the recirculation diodes anti-parallelly to the switching devices of the inverter. Usually, these recirculation diodes are not sufficiently robust to resist the high circulating transient currents, which can reach levels of hundreds or even thousands of amperes of amplitude, and are thus lethal for the aforesaid recirculation diodes.

Additionally, the switching devices themselves may need to switch these transient currents with a consequent high stress which very often leads to the destruction of the devices concerned by the described transient.

Accompanying FIGS. 1 and 2 show an example of the described situation.

FIGS. 1 and 2 show inverters of the single-stage and of the double-stage type for the direct connection to the power grid. In general, double-stage inverters may be provided with one or more independent input channels. When a transient overvoltage 11 occurs on the power grid 10, a transient current 12 of much higher frequency than that of the power grid freely crosses the recirculation diodes 13 of the inverter and the filter capacitor on the DC voltage from the photovoltaic assemblies. This current flows in a circuit of usually very low impedance and may reach even peak values of thousands of Amperes.

It is apparent that this current is very dangerous for the semiconductor devices present in the inverter, the switches and recirculation diodes in particular.

It is thus the object of the present invention to introduce a device adapted to solve the technical problem described above, and consequently to allow the semiconductor devices of the inverter, and thus the inverter itself, to survive the transient phenomena present on the power grid.

Further features and advantages of the present invention will be apparent in the following description of a non-limitative embodiment with reference to the figures in the accompanying drawings, which are diagrammatic and show functional blocks which are adapted to be made according to different circuitry solutions in practice. In detail:

SUMMARY

Figure 1:
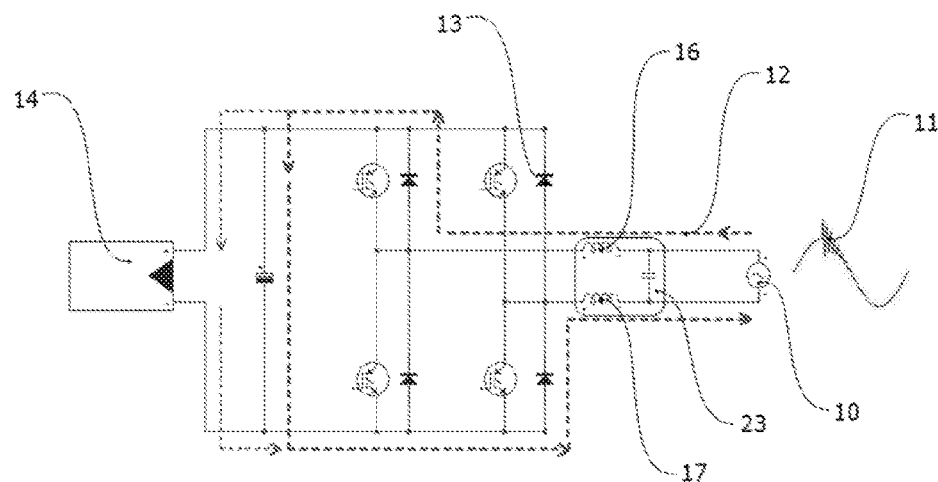
FIG. 1 shows the diagrammatic circuit of a single-stage inverter concerned by the transient phenomenon present on the power grid and the path of the consequent transient current.
Figure 2:
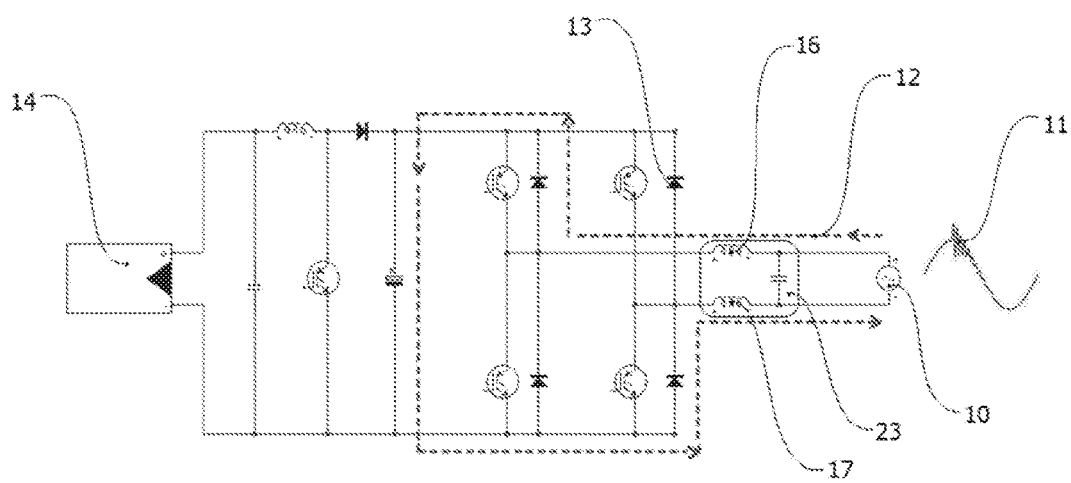
FIG. 2 shows the diagrammatic circuit of a double-stage inverter concerned by the transient phenomenon present on the power grid and the path of the consequent transient current.

The present invention relates to a transient current protection device for electrical energy conversion systems connected to the power grid, comprising a diode bridge connected between the power grid and the power section of said inverter, upstream of the main filtering inductors.

DETAILED DESCRIPTION

The main object of the present invention is to introduce an additional protection device for inverter apparatuses, in particular for inverter apparatuses to be connected directly to the power grid, adapted to be arranged between the power grid and the power section of said inverter, upstream of the main filtering inductors so as to constitute an alternative path for possible transient currents, which therefore can no longer cross the recirculation diodes of the switching devices or the switching devices.

Another object of the present invention is to introduce a new inverter apparatus, in particular an inverter apparatus to be connected directly to the power grid provided with said additional device.

A preferred embodiment of the device 15 object of the present invention comprises a diode bridge, or Graetz bridge, connected between the power section of said inverter and the power grid 10, downstream of the output filter 23, usually comprising at least two filtering inductors 16, 17. The cathode 18 coupled to the positive terminal of the inverter DC voltage input, downstream of the filter capacitor, either by means of direct electrical connection or by means of a further intermediate element; the anode 19 of the negative terminal of the inverter DC voltage input, downstream of the filter capacitor and the two intermediate terminals 20, 21 electrically connected to the inverter output terminals, i.e. to the two terminals of the power grid.

Figure 3:
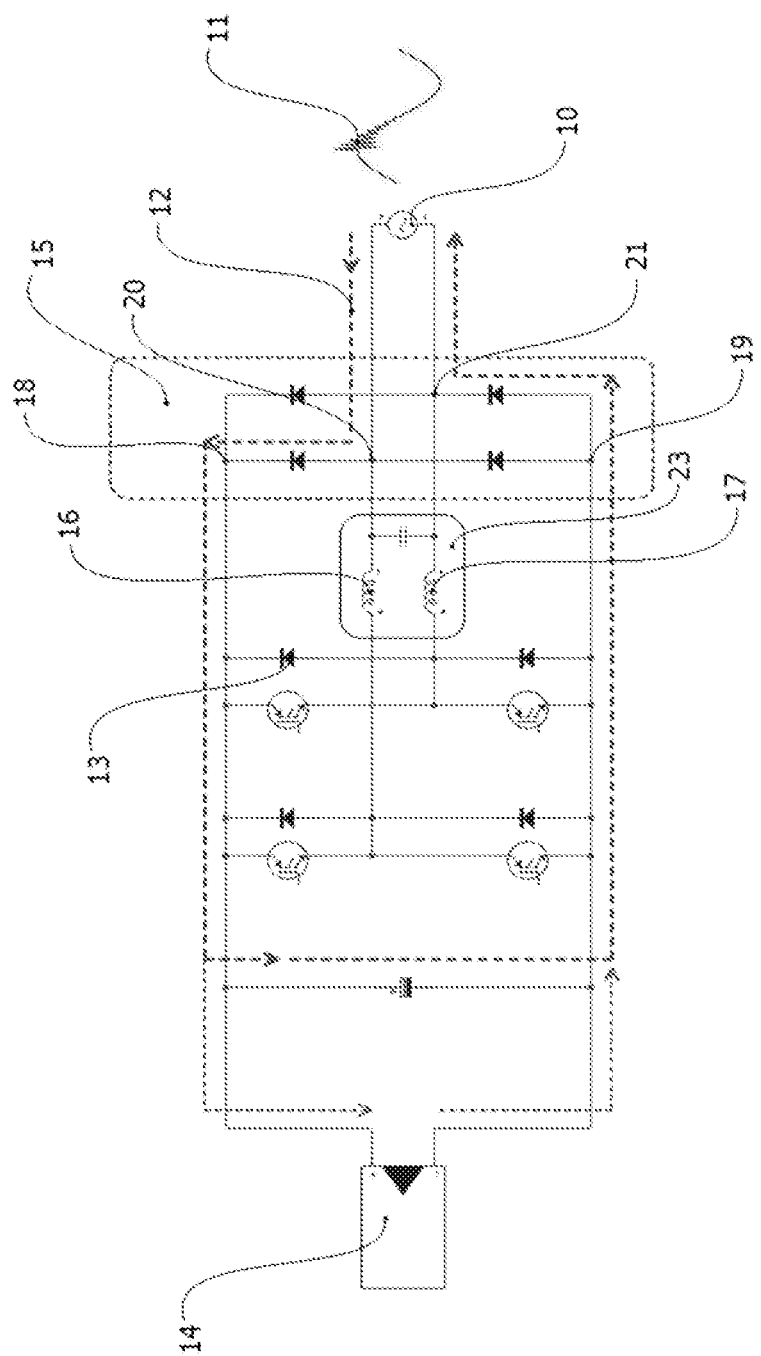
FIG. 3 shows the diagrammatic circuit of a single-stage inverter comprising a first preferred embodiment of the device according to the present invention, concerned by a transient phenomenon present on the power grid and the path of the consequent transient current.
Figure 4:
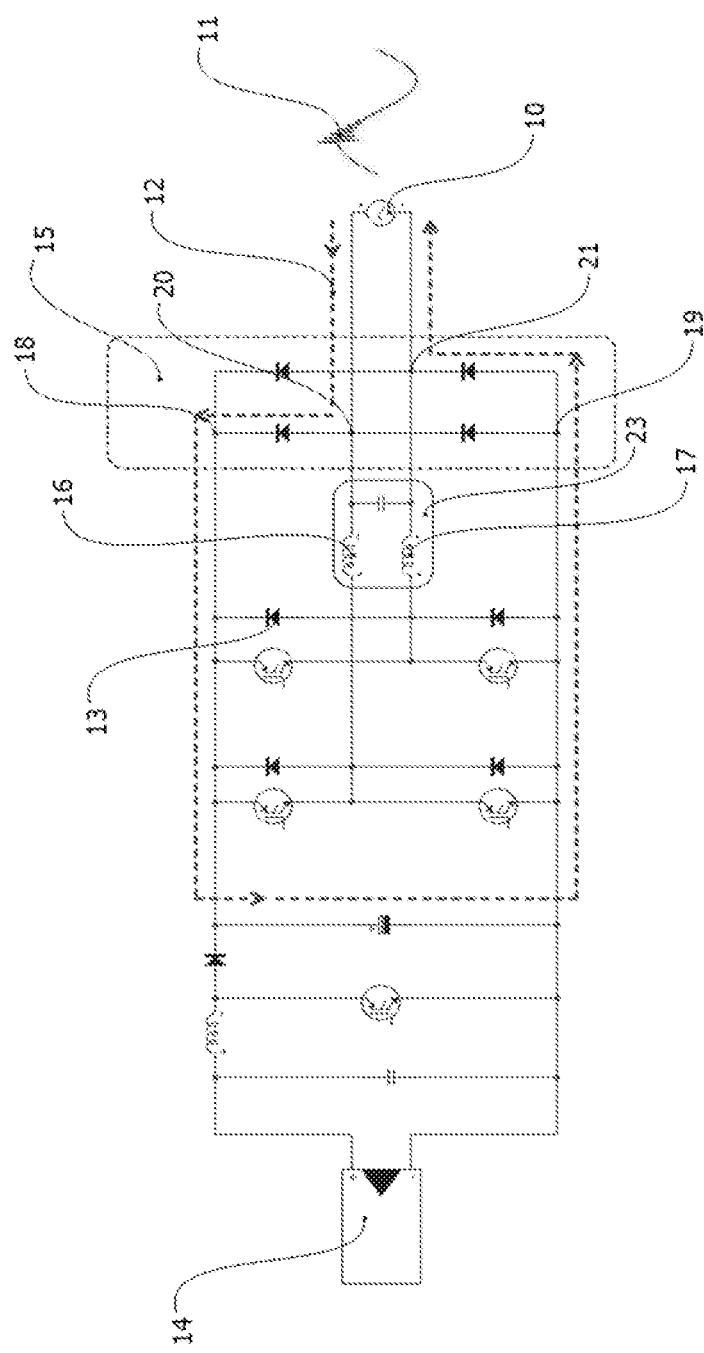
FIG. 4 shows the diagrammatic circuit of a double-stage inverter comprising a first preferred embodiment of the device according to the present invention, concerned by a transient phenomenon present on the power grid and the path of the consequent transient current.

Accompanying FIGS. 3 and 4 show two examples of application of a first preferred embodiment of the device 15 according to the present invention inverter in the cases of inverter for the direct connection to the power grid of the single-stage and the double-stage type.

When a transient overvoltage 11 occurs on the power grid 10, a transient current 12 of much higher frequency than that from the grid flows from the power grid to the inverter but is "intercepted" by the diodes of the Graetz bridge, which operate as bypass with regards to the recirculation diodes 13 of the inverter, and which make said current flow circulate through the filter capacitor arranged on the DC voltage coming from the photovoltaic assemblies 14, for example.

The introduction of the diode bridge circuitry according to the present invention, between the power grid and the stage power of the inverter, upstream of the main filtering inductors, thus constitutes an alternative path for the transient currents, which will no longer cross the recirculation diodes of the switching devices, thus protecting them.

Components with specific features of resistance to current transients can be selected to make the device 15 according to the present invention, regardless of switching speed needs, which are instead of primary importance in the choice of the semiconductor switching devices used in the power stage of the inverter.

The device 15 according to the present invention may be advantageously made using suitable sized common, cost-effective bridge rectifying modules in relation to the transiting currents.

Figure 5:
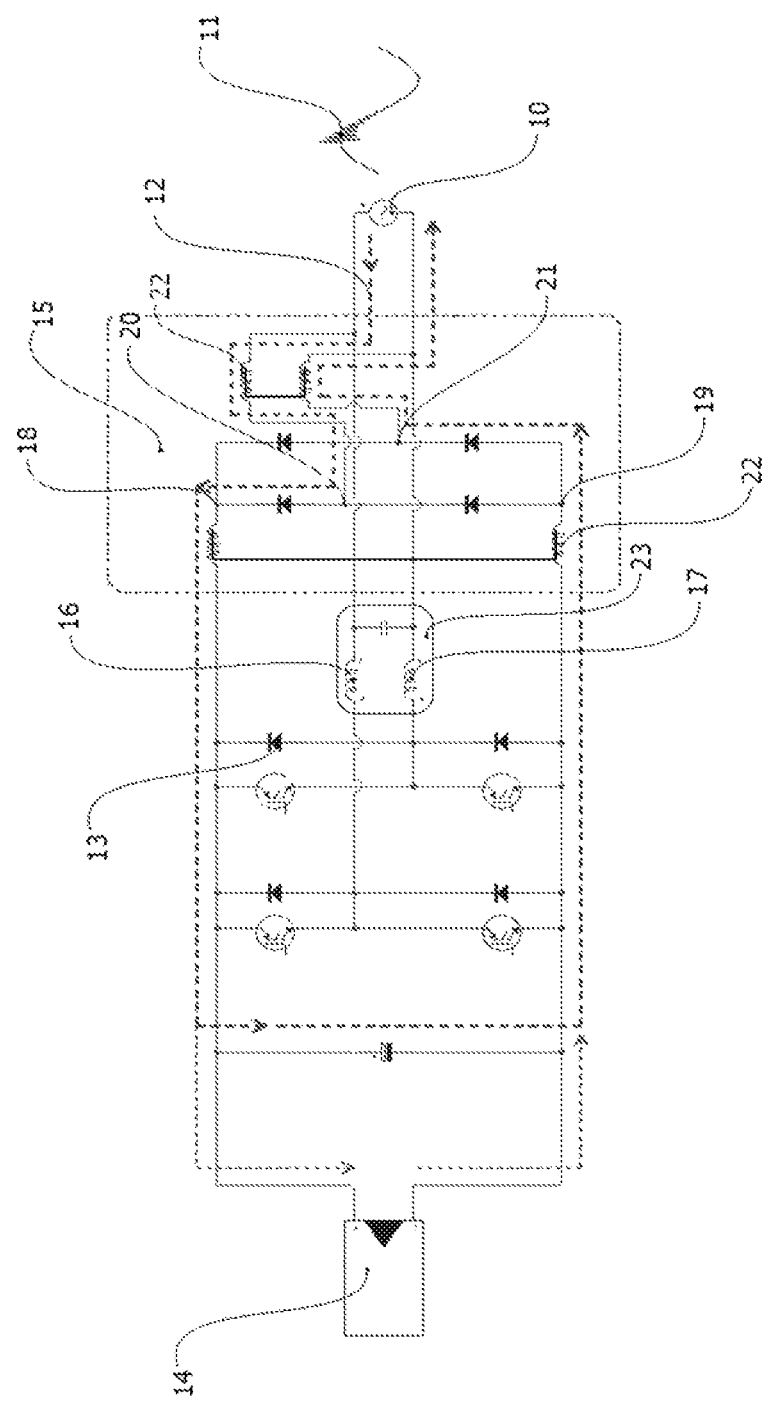
FIG. 5 shows the diagrammatic circuit of a single-stage inverter comprising a first preferred embodiment of the device according to the present invention, comprising common-mode eddy current abatement filters, concerned by a transient phenomenon present on the power grid and the path of the consequent transient current.

With reference to accompanying FIG. 5, said first preferred embodiment of the device 15 according to the present invention may comprise at least one common-mode eddy current blocking filter 22 made by means of a pair of mutually coupled inductors.

Said filter 22 is preferably made of a ferromagnetic core on which two electrical conductors are wound. The ferromagnetic core must have a high permeability value, which must remain as constant as possible in the concerned frequency range, for example in the 150 kHZ-30 MHz range. Such a high permeability value allows to obtain a mutual induction coefficient M which is as similar as the inductance value L as possible.

Said filter 22 may be electrically connected upstream of said diode bridge, downstream of said diode bridge, or even both upstream and downstream of said diode bridge. For example, when it is connected upstream of said diode bridge, said filter is made of an appropriate ferromagnetic core on which two electrical conductors are wound: a first conductor, which connects the positive terminal to the inverter DC voltage input, downstream of the filter capacitor, to the cathode 18 of said diode bridge, a second conductor which electrically connects the anode 19 of said diode bridge to the negative terminal of the inverter DC voltage input, downstream of the filter capacitor.

For example, when it is connected downstream of said diode bridge, said filter 22 is made of an appropriate ferromagnetic core on which two electrical conductors are wound which connect the two intermediate terminals 20, 21 of said diode bridge to the output terminals of the inverter.

Figure 6:
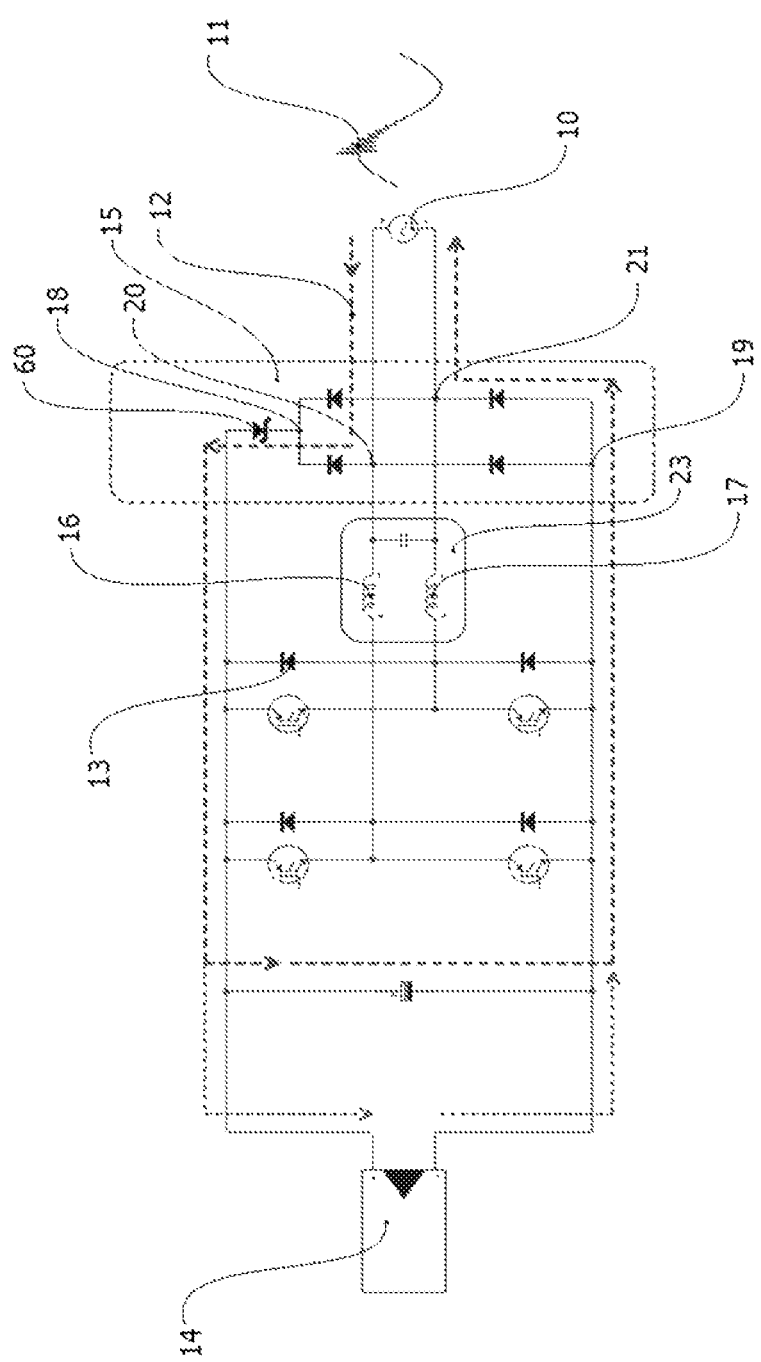
FIG. 6 shows the diagrammatic circuit of a single-stage inverter comprising a second preferred embodiment of the device according to the present invention, concerned by a transient phenomenon present on the power grid and the path of the consequent transient current.
Figure 7:
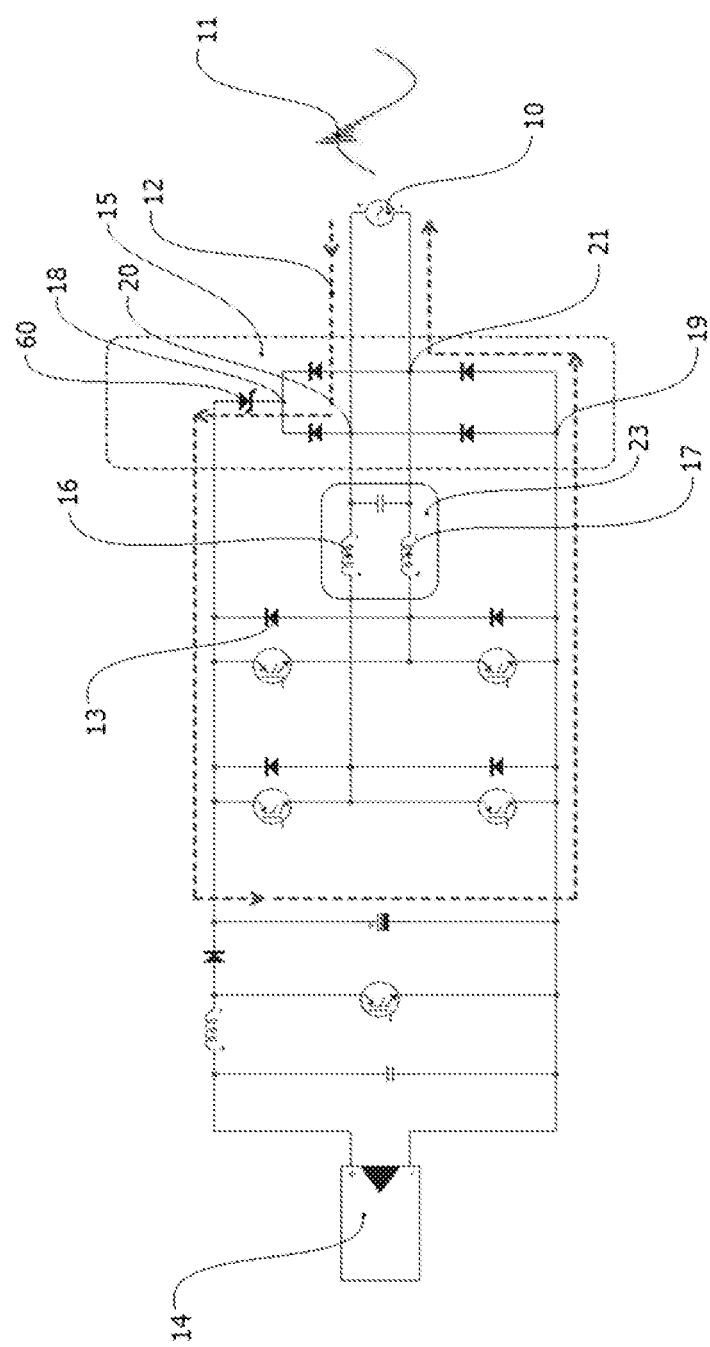
FIG. 7 shows the diagrammatic circuit of a double-stage inverter comprising a second preferred embodiment of the device according to the present invention, concerned by a transient phenomenon present on the power grid and the path of the consequent transient current.
Figure 8:
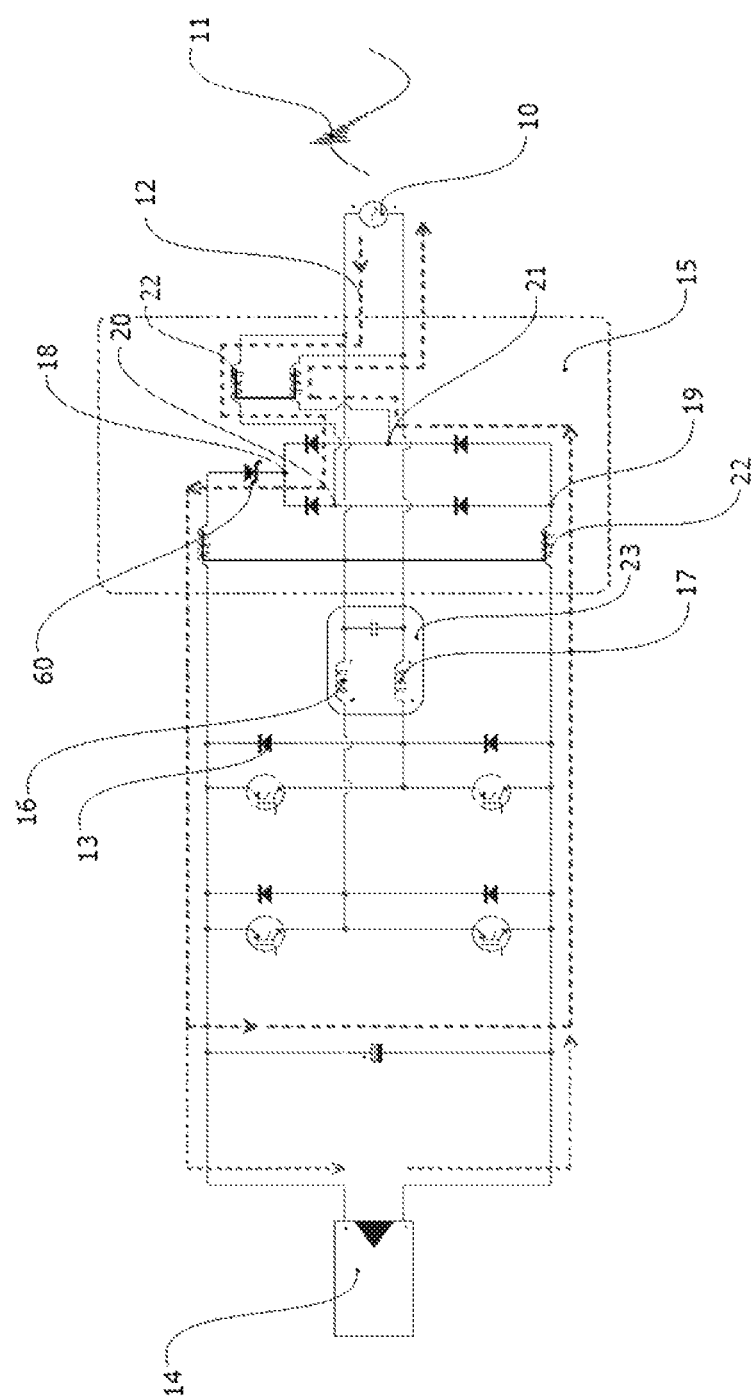
FIG. 8 shows the diagrammatic circuit of a single-stage inverter comprising a second preferred embodiment of the device according to the present invention, comprising common-mode eddy current abatement filters, concerned by a transient phenomenon present on the power grid and the path of the consequent transient current.

Accompanying FIGS. 6, 7 and 8 show two examples of application of a second preferred embodiment of the device 15 according to the present invention inverter in the cases of inverter for the direct connection to the power grid of the single-stage and the double-stage type.

This second preferred embodiment is applied to cases in which the particular type of PWM modulation of the switches of the inverter—for example, modulations in which the upper switches of the inverter remain conducting for an entire half-period—may cause the undesired conduction of said diode bridge during normal operation. This undesired condition of the diodes of said diode bridge may produce a distortion of the inverter output current also because the current across the diodes of said diode bridge is not involved in the control loop which regulates the operation of the inverter.

In order to solve the aforesaid drawback, said second preferred embodiment of the present invention uses a transient voltage suppressor 60 (also indicated by the acronym TVS) connected with the cathode to the cathode 18 of said diode bridge and with the anode to the positive terminal of the inverter DC voltage input, downstream of the filter capacitor.

Said TVS 60 operates so as to introduce a sort of activation threshold for said diode bridge, avoiding the biasing to conduction mode of the diodes of said diode bridge in absence of transient over-voltages on the power grid voltage.

The chosen value of the breakdown voltage of said TVS 60 must be sufficiently low to avoid completely inhibiting the operation of said diode bridge in presence of transient phenomena on the power grid. A breakdown voltage of said TVS 60 either lower or equal to 10V is sufficient to guarantee the correct operation of the system in most applications.

Figure 9:
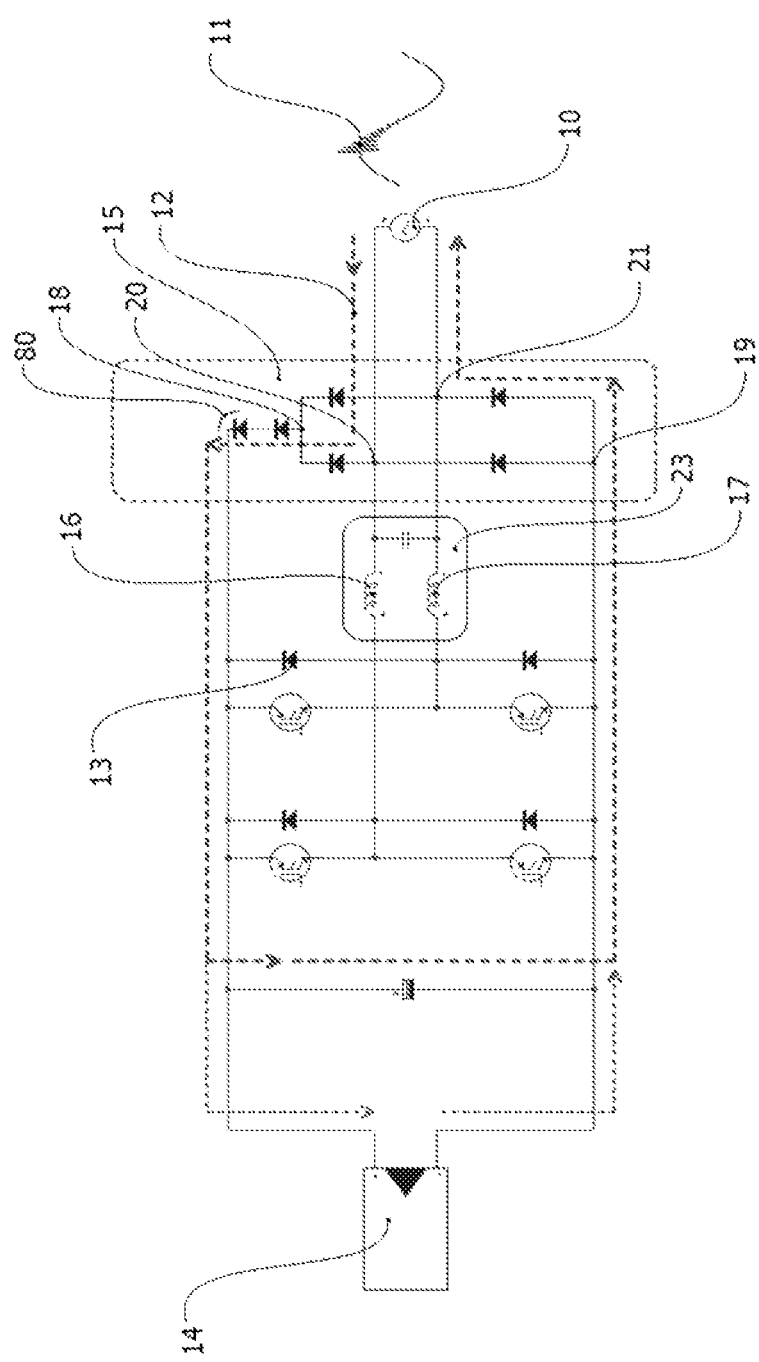
FIG. 9 shows the diagrammatic circuit of a single-stage inverter comprising a third preferred embodiment of the device according to the present invention, concerned by a transient phenomenon present on the power grid and the path of the consequent transient current.
Figure 10:
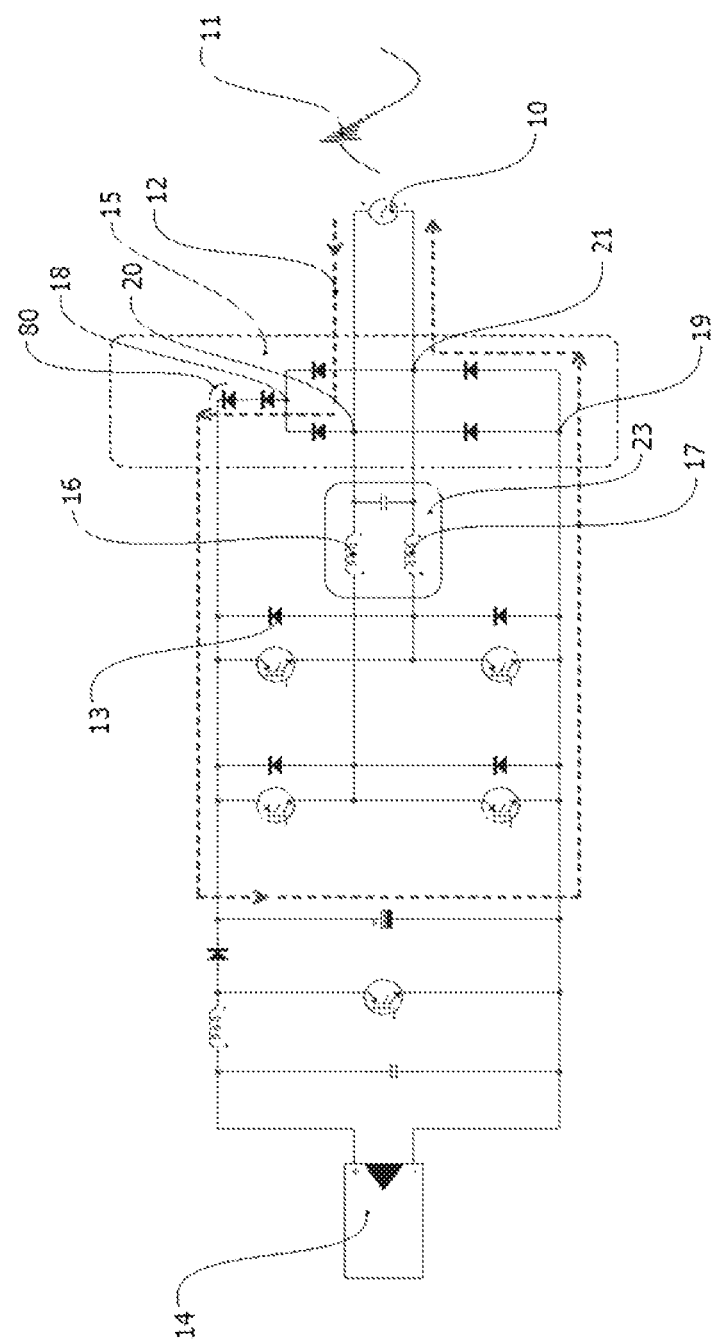
FIG. 10 shows the diagrammatic circuit of a double-stage inverter comprising a third preferred embodiment of the device according to the present invention, concerned by a transient phenomenon present on the power grid and the path of the consequent transient current.
Figure 11:
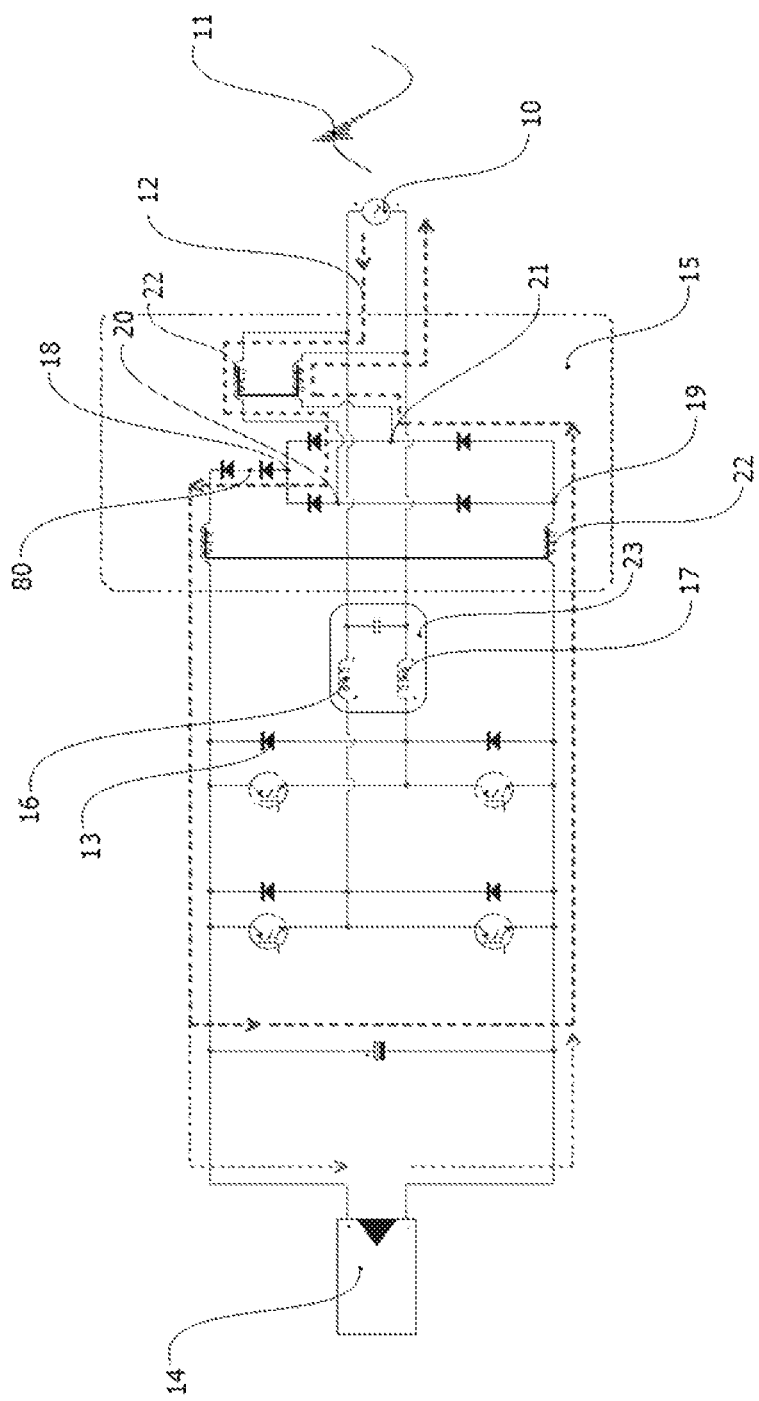
FIG. 11 shows the diagrammatic circuit of a single-stage inverter comprising a third preferred embodiment of the device according to the present invention, comprising common-mode eddy current abatement filters, concerned by a transient phenomenon present on the power grid and the path of the consequent transient current.

Finally, accompanying FIGS. 9, 10 and 11 show two examples of application of a third preferred embodiment of the device 15 according to the present invention inverter in the cases of inverter for the direct connection to the power grid of the single-stage and the double-stage type.

This third preferred embodiment of the present invention uses a series of diodes 80 connected with the anode to the cathode 18 of said diode bridge and with the cathode to the positive terminal of the DC voltage inverter input, downstream of the filter capacitor, instead of said TVS 60. The series of diodes 80 operates in a manner similar to the TVS 60 described above, introducing a sort of activation threshold for said diode bridge, thus avoiding biasing the diodes of said diode bridge to conduction mode in absence of transient over-voltages on the power grid voltage.

Also in this third preferred embodiment of the present invention, the chosen value of the breakdown voltage of said series of diodes 80 must be sufficiently low to completely inhibit the operation of said diode bridge in presence of transient phenomena on the power grid. A breakdown voltage of said diode bridge 80 either lower than or equal to 10V is sufficient to guarantee correct system operation in most applications.

The present invention does not apply only to single-phase inverters, as those shown for the sake of simplicity in the accompanying figures, but also applies indifferently to three-phase systems and, more in general, to multi-phase systems, simply by using diode bridges comprising a suitable number of branches equal to the number of lines to be protected.

The invention claimed is:

1. A protection device structured to be coupled between a DC/AC inverter and a power grid, the protection device comprising:
   input terminals adapted to be electrically connected to a filter of said DC/AC inverter;
   a first output terminal adapted to be connected to the positive DC input terminal of said DC/AC inverter;
   a second output terminal adapted to be connected to the negative DC input terminal of said DC/AC inverter;
   power grid terminals adapted to be connected to the power grid; and
   a diode bridge, the cathode of said diode bridge being coupled to said first output terminal, the anode of said diode bridge being electrically connected to said second output terminal, and the two intermediate terminals of said diode bridge being electrically connected between said input terminals and the power grid terminals,
   wherein the protection device is structured to receive a power grid power transient from the power grid with the diode bridge and transmit the power grid power transient to the first and second output terminals by way of the diode bridge so as to not transmit the power grid power transient to the input terminals.

2. A device according to claim 1, which further comprises a one-way transient voltage suppressor means electrically connected between the cathode of said diode bridge and said first output terminal.

3. A device according to claim 2, wherein said one-way transient voltage suppressor means comprise a transient voltage suppressor having the cathode electrically connected to the cathode of said diode bridge and the anode electrically connected to said first output terminal.

4. A device according to claim 2, wherein said one-way transient voltage suppressor means comprise a series of diodes having the anode of the first diode of the series electrically connected to the cathode of said diode bridge and the cathode of the last diode of the series electrically connected to said first output terminal.

5. A device according to claim 4, wherein the breakdown voltages of said transient voltage suppressor and of said series of diodes are either lower than or equal to 10V.

6. A device according to claim 2, which further comprises at least one common-mode eddy current blocking filter associated with said input terminals.

7. A device according to claim 2, wherein said diode bridge comprises a number of branches equal to the number of phases of said DC/AC inverter.

8. A device according to claim 1, which further comprises at least one common-mode eddy current blocking filter associated with said input terminals.

9. A device according to claim 8, wherein said filter is made of a ferromagnetic core on which two electrical conductors are wound.

10. A device according to claim 8, wherein said at least one common-mode eddy current blocking filter is made by a pair of mutually coupled inductors.

11. A device according to claim 8, wherein said at least one common-monde eddy current blocking filter comprises a plurality of mutually coupled inductors equal in number to the phases of said inverter apparatus.

12. A device according to claim 1, which further comprises at least one common-mode eddy current blocking filter associated with said first and second output terminals.

13. A device according to claim 12, wherein said at least one common-mode eddy current blocking filter is made by a pair of mutually coupled inductors.

14. A device according to claim 12, wherein said filter is made of a ferromagnetic core on which two electrical conductors are wound.

15. A device according to claim 12, wherein said at least one common-mode eddy current blocking filter comprises a plurality of mutually coupled inductors equal in number to the phases of said inverter apparatus.

16. A device according to claim 1, wherein said diode bridge comprises a number of branches equal to the number of phases of said DC/AC inverter.

17. A DC/AC inverter apparatus comprising:
   positive and negative DC input terminals,
   AC output terminals being the common points of the two serially connected switches of a full bridge,
   a filter device having filter input terminals connected to said two AC output terminals and filter output terminals connected to the grid connection terminals, and
   a diode full bridge based protection device, the input terminals of said protection device being electrically connected to Dower grid connection terminals, a first output terminal of said protection device being connected to said positive DC input terminal through a one-way transient voltage suppressor, a second output terminal of said protection device being connected to said negative DC input terminal.

18. An AC electrical energy production system from DC electrical energy sources comprising photovoltaic panels, which further comprises at least one DC/AC inverter according to claim 17.

19. AC electrical energy production system from DC electrical energy sources comprising wind generators, which further includes at least one DC/AC inverter according to claim 17.

20. The device of claim 17 wherein the protection device is structured to receive a power grid power transient from the power grid connection terminals with the diode bridge and transmit the power grid power transient to the first and second output terminals by way of the diode bridge so as to not transmit the power grid power transient to the filter output terminals.

21. A power system coupled to a power grid comprising:
an inverter including two DC input terminals, a plurality of switching devices structured to receive DC power from the DC input terminals and convert the DC power to AC power having at least one phase, a plurality of recirculation diodes each coupled in anti-parallel with one of the plurality of switching devices, and two AC output terminals structured to output the converted AC power;
a filter including two filter input terminals coupled to the two AC output terminals, a plurality of passive components structured to receive the converted AC power and output filtered AC power, and two filter output terminals structured to output the filtered AC power; and
a passive protection device coupled between the filter and the power grid, including a diode bridge coupled to the filter and the DC input terminals of the inverter, and structured so as to receive a power grid power transient and transmit the power grid power transient to the DC input terminals without the power grid power transient flowing through the plurality of recirculation diodes.

22. The power system of claim 21 comprising a photovoltaic power source coupled to the two DC input terminals and a smoothing capacitor coupled across the two DC input terminals, wherein the smoothing capacitor is structured to receive the power grid power transient.

23. The power system of claim 21 wherein the plurality of switching devices is structured to convert the received DC power to multiphase AC power.

24. The power system of claim 21 wherein the passive protection device includes a pair of mutually coupled inductors coupled between the passive protection Response to Non-Final Office Action device and the power grid.

25. The power system of claim 24 wherein the passive protection device includes a pair of mutually coupled inductors coupled between the diode bridge and the DC input terminals.

26. The power system of claim 24 wherein the passive protection device includes a diode coupled between one of the DC input terminals and the diode bridge.

* * * * *